(12) United States Patent
Kim (10) Patent No.: US 7,739,425 B2
(45) Date of Patent: Jun. 15, 2010

(54) TWO CHANNEL COMPUTER BUS ARCHITECTURE

(75) Inventor: Jinsoo Kim, Chula Vista, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 571 days.

(21) Appl. No.: 11/040,530

(22) Filed: Jan. 21, 2005

(65) Prior Publication Data

US 2005/0198416 A1    Sep. 8, 2005

Related U.S. Application Data

(60) Provisional application No. 60/538,963, filed on Jan. 22, 2004.

(51) Int. Cl.
| | |
|---|---|
| G06F 13/00 | (2006.01) |
| G06F 13/372 | (2006.01) |
| G06F 13/36 | (2006.01) |
| G06F 15/173 | (2006.01) |
| H04L 12/28 | (2006.01) |
| H04J 3/26 | (2006.01) |
| H04J 3/16 | (2006.01) |

(52) U.S. Cl. .................... 710/33; 710/35; 710/107; 710/117; 710/124; 710/309; 709/244; 370/431; 370/432; 370/471

(58) Field of Classification Search ............... 710/33, 710/35, 107, 117, 124, 309; 709/244; 370/431, 370/432, 471
See application file for complete search history.

(56) References Cited

U.S. PATENT DOCUMENTS

| | | | | |
|---|---|---|---|---|
| 5,450,547 | A | | 9/1995 | Nguyen et al. ............... 395/250 |
| 5,925,118 | A | * | 7/1999 | Revilla et al. ............... 710/110 |
| 6,594,712 | B1 | | 7/2003 | Pettey et al. .................. 710/22 |
| 6,842,816 | B1 | * | 1/2005 | Primrose .................... 710/305 |
| 7,103,823 | B2 | * | 9/2006 | Nemawarkar et al. ....... 714/758 |
| 2003/0112805 | A1 | | 6/2003 | Stanton .................. 370/395.1 |
| 2004/0068603 | A1 | * | 4/2004 | Augsburg et al. ........... 710/310 |

OTHER PUBLICATIONS

IBM Corporation, "64-Bit Processor Local Bus", Architecture Specifications, Version 3.5, May 2001, pp. 1-7.*
InfiniBand$^{SM}$ Trade Association. "InfunBand™ Architecture Specification vol. 1, Release 1.0.a". Jun. 2001. pp. 1-136.

* cited by examiner

*Primary Examiner*—Niketa I Patel
(74) *Attorney, Agent, or Firm*—William M. Hooks (57) ABSTRACT

Various methods and processing systems are disclosed which include sending and receiving components communicating over a bus having first and second channels. The sending component may broadcast on the first channel a plurality of read and write address locations, a plurality of transfer qualifiers, and write data. The receiving component may store the write data broadcast on the first channel at the receiving component based on the write address locations and a first portion of the transfer qualifiers. The receiving component may also retrieve read data from the receiving component based on the read address locations and a second portion of the transfer qualifiers, and broadcast the retrieved read data on the second channel.

34 Claims, 5 Drawing Sheets

TWO CHANNEL COMPUTER BUS ARCHITECTURE

RELATED APPLICATIONS

This application claims priority to U.S. Provisional Application No. 60/538,963, filed Jan. 22, 2004, now abandoned.

BACKGROUND

1. Field

The present disclosure relates generally to digital systems, and more specifically, to a two channel bus structure capable of supporting address information, data and transfer qualifiers.

2. Background

Computers have revolutionized the electronics industry by enabling sophisticated processing tasks to be performed with just a few strokes of a keypad These sophisticated tasks involve an incredibly high number of complex components that communicate with one another in a fast and efficient manner using a bus. A bus is a channel or path between components in a computer.

A typical computer includes a microprocessor with system memory. A high bandwidth system bus may be used to support communications between the two. In addition, there may also be a lower performance peripheral bus which is used to transfer data to lower bandwidth peripherals. In some cases, there may also be a configuration bus which is used for the purpose of programming various resources. Bridges may be used to efficiently transfer data between the higher and lower bandwidth buses, as well as provide the necessary protocol translation.

Many buses resident in a computer have traditionally been implemented as shared buses. A shared bus provides a means for any number of components to communicate over a common path or channel. In recent years, shared bus technology has been replaced to a large extent by point-to-point switched connections. Point-to-point switched connections provide a direct connection between two components on the bus while they are communicating with each other. Multiple direct links may be used to allow several components to communicate at the same time.

Conventional bus designs include independent and separate read, write and address channels. A microprocessor, for example, can read or write to system memory by placing an address location on the address channel and sending the appropriate read/write control signal. When the microprocessor writes data to system memory, it sends the data over the write channel. When the microprocessor reads data from system memory, it receives the data over the read channel.

Although this particular bus structure provides a fairly standardized way to communicate between components of a computer, it requires a number of dedicated channels. These channels require driver, receiver and buffer circuits, all of which consume power. In integrated circuit applications, these channels occupy valuable chip area. Accordingly, there is a need in the art for a simplified bus structure.

SUMMARY

In one aspect of the present invention, a method of communicating between a sending component and a receiving component over a bus includes broadcasting from the sending component on a first channel a plurality of read and write address locations, a plurality of transfer qualifiers, and write data. The receiving component stores the write data broadcast on the first channel based on the write address locations and a first portion of the transfer qualifiers. The receiving component also retrieves read data from the receiving component based on the read address locations and a second portion of the transfer qualifiers, and broadcasts the retrieved read data on the second channel.

In another aspect of the present invention a processing system includes a bus having first and second channels. A sending component is configured to broadcast on the first channel a plurality of read and write address locations, a plurality of transfer qualifiers, and write data. A receiving component is configured to store the write data broadcast on the first channel based on the write address locations and a first portion of the transfer qualifiers. The receiving component is also configured to retrieve read data based on the read address locations and a second portion of the transfer qualifiers, and broadcast the retrieved read data on the second channel.

In yet another aspect of the present invention, a processing system includes a bus having first and second channels. The processing system also includes means for broadcasting on the first channel a plurality of read and write address locations, a plurality of transfer qualifiers, and write data. The processing system further includes means for storing the write data broadcast on the first channel based on the write address locations and a first portion of the transfer qualifiers, retrieving read data based on the read address locations and a second portion of the transfer qualifiers, and broadcasting the retrieved read data on the second channel.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

Figure 1:
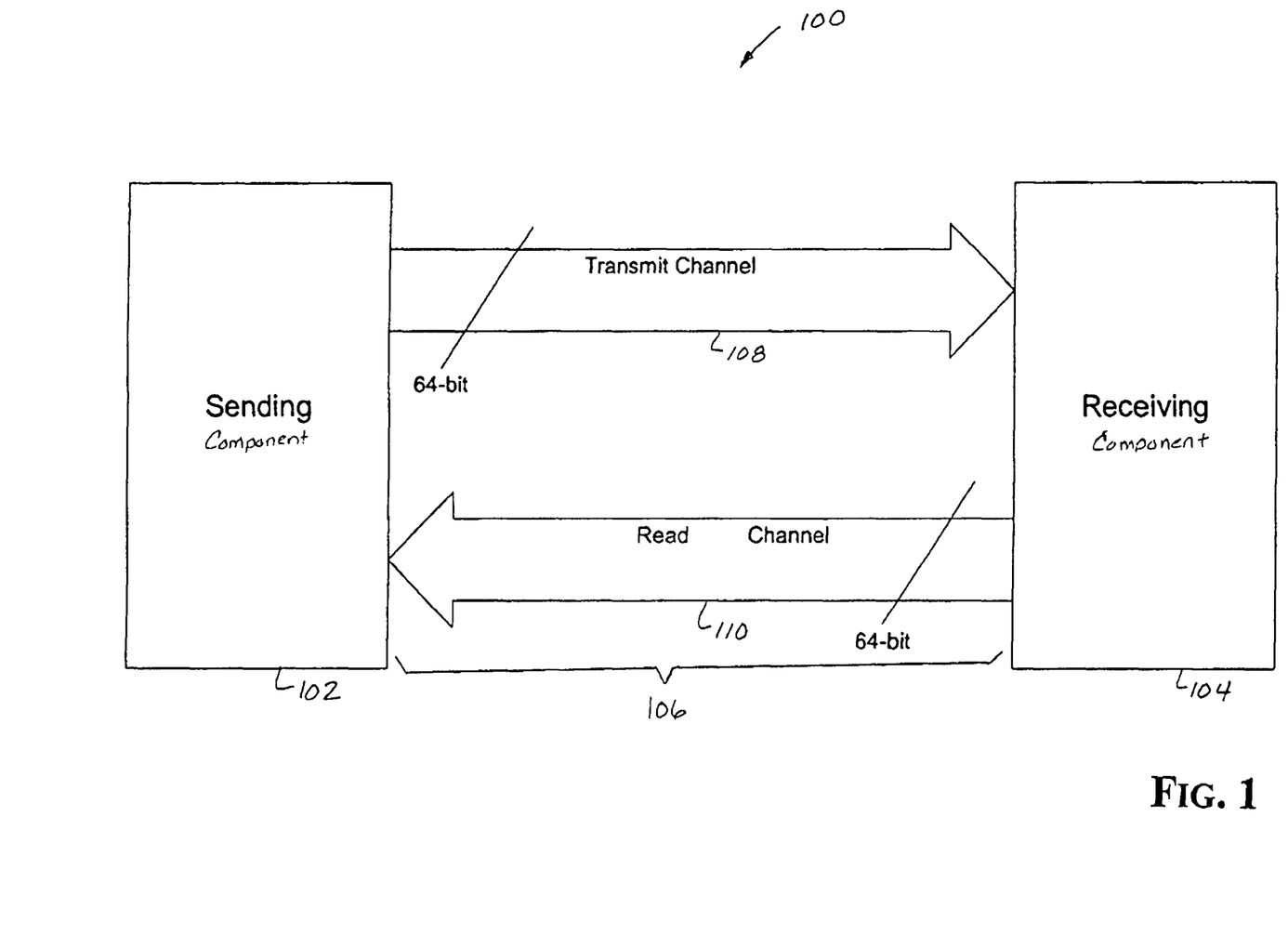
FIG. 1 is a conceptual block diagram illustrating an example of a point-to-point connection between two components in a processing system over a two channel bus.

FIG. 1 is a conceptual block diagram illustrating an example of a point-to-point connection over a bus between two components in a processing system. The processing system 100 may be a collection of components that cooperate to perform one or more processing functions. Typically, the processing system will be a computer, or resident in a computer, and capable of processing, retrieving and storing information.

The processing system 100 is shown with a sending component 102 in communication with a receiving component 104 over a bus 106. In one embodiment of the processing system 100, the bus 106 is a dedicated bus between the sending component 102 and the receiving component. In another embodiment of the processing system 100, the sending component 102 communicates with the receiving component 104 with a point-to-point connection over the bus 106 through a bus interconnect (not shown). Moreover, as those skilled in the art will readily appreciate, the inventive aspects described throughout this disclosure are not limited to a dedicated bus or point-to-point switching connection, but may be applied to any type of bus technology including, by way of example, a shared bus.

The sending component 102 may be any type of bus mastering component including, by way of example, a microprocessor, a digital signal processor (DSP), a direct memory access controller, a bridge, a programmable logic component, discrete gate or transistor logic, or any other information processing component.

The receiving component 104 may be any storage component, including, by way of example, registers, memory, a bridge, or any other component capable of retrieving and storing information. The storage capacity at each address location of the receiving component may vary depending on the particular application and the overall design constraints. For the purposes of explanation, the receiving component will be described with a storage capacity of 1-byte per address location.

The complexity of the bus 106 may be reduced by eliminating the address channel that is used in conventional bus structures. The elimination of the address channel may be achieved by redefining the write channel as a "transmit channel" 108. The transmit channel 108 may be used as a generic medium for broadcasting information between the sending component 102 and the receiving component 104 in a time division multiplexed fashion. This information may include address information, write data, transfer qualifiers, or any other bus related information. The term "transfer qualifier" refers to a parameter that describes an attribute of a read operation, write operation, or any other bus related operation. A "group of transfer qualifiers" refers to one or more transfer qualifiers associated with a single read operation, write operation, or other bus related operation. Examples of transfer qualifiers include a read/write signal, a payload size signal, a byte enable signal, a burst transmission signal, transfer identification tags, a security signal, and a cacheable attribute signal. Each of these transfer qualifiers will be discussed in greater detail later. Those skilled in the art will readily understand that the transfer qualifiers used in actual implementations may vary depending on the specific application and the overall design constraints. The transfer qualifiers used in these implementations may include any combination of one or more transfer qualifiers described above and/or any other signal parameter that describes an attribute of any bus related operation.

Figure 2:
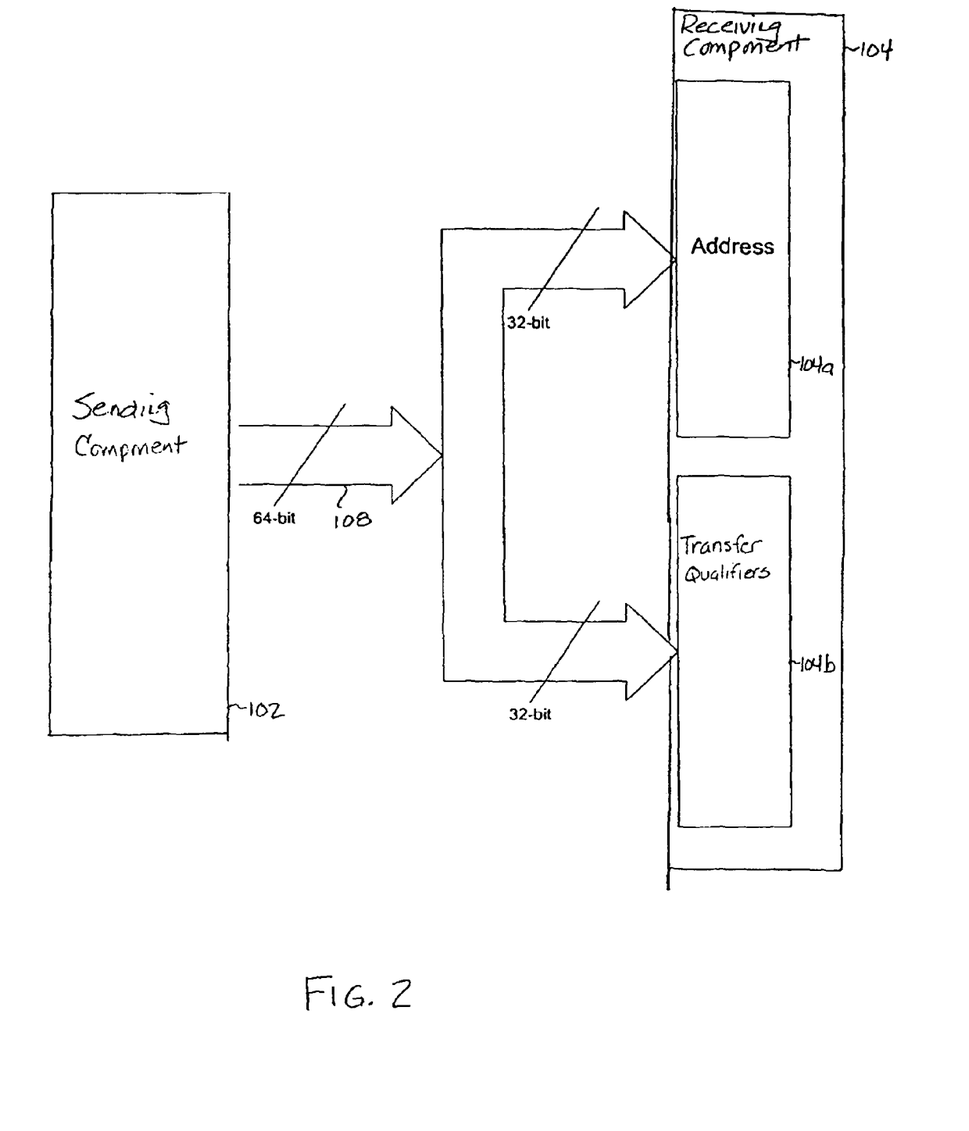
FIG. 2 is a conceptual block diagram illustrating an example of a point-to-point connection between two components in a processing system over a two channel bus capable of supporting address information, data, and transfer qualifiers.

In at least one embodiment of the bus 106, both the transmit channel 108 and the read channel may be 64-bits wide with 8 byte lanes. This allows the sending component 102 to broadcast up to 8-bytes of write data on the transmit channel 108, and the receiving component 104 to broadcast up to 8-bytes of read data on the read channel 110. In addition, the sending component 102 may be able to simultaneously broadcast a 32-bit address and up to 32-bits of transfer qualifiers on the transmit channel 108 as illustrated conceptually in FIG. 2.

Returning to FIG. 1, the sending component 102 may perform any bus related operation including reading from or writing to the receiving component 104. In the case where the sending component 102 writes to the receiving component 104, the sending component may broadcast an address location along with a group of transfer qualifiers over the transmit channel 108 followed by a payload. The term "payload" refers to the data associated with a single read or write operation. In this case, the transfer qualifiers may include a "read/write signal" to indicate a write operation, and a "payload size signal" to indicate the number of data bytes contained in the payload. If the payload is multiple bytes, then the receiving component 104 may store the payload in a block of sequential address locations beginning with the address location broadcast on the transmit channel 108. By way of example, if the sending device 102 broadcasts an address location $100_{HEX}$ followed by a 4-byte payload, the receiving component 104 may write the payload to a block of address locations starting at $100_{HEX}$ and ending at $103_{HEX}$.

In the case where the sending component 102 reads from the receiving component 104, the address location and the associated group of transfer qualifiers may be the only information that needs to be broadcast on the transmit channel 108. The transfer qualifiers may include a "read/write signal" to indicate a read operation, and a "payload size signal" to indicate the number of data bytes contained in the payload. If the payload is multiple bytes, then the receiving component 104 may read the payload from a block of sequential address locations beginning with the address location broadcast on the transmit channel 108. By way of example, if the sending device 102 broadcasts an address location $200_{HEX}$ and requests a 4-byte payload, the receiving component 104 may retrieve the payload from a block of address locations starting at $200_{HEX}$ and ending at $203_{HEX}$.

In addition to the read/write and payload size signals, a transfer qualifier group may include a byte enable signal. The "byte enable signal" may be used to indicate which byte lanes will be used to broadcast the payload. By way of example, a 4-byte payload broadcast on the transmit channel 108 or read channel 110 may use 4 of the 8 byte lanes. The byte enable signal for a write operation may be used to indicate to the receiving component 104 which of the 4 byte lanes on the transmit channel 108 will be used to broadcast the payload. Similarly, the byte enable signal for a read operation may be used to indicate to the receiving component 104 which of the 4 byte lanes on the read channel 110 that the sending component expects to receive the payload on.

The transfer qualifier group may also include a burst transmission signal. The "burst transmission signal" may be used to indicate whether the payload will be broadcast in a single or burst transmission. A "single transmission" occurs when the entire payload is broadcast on the transmit or read channel 108 and 110 in a single clock cycle. Thus, a single transmission may be used to broadcast an 8-byte payload with all byte lanes enabled. A "burst transmission," on the other hand, occurs when the payload is broadcast on the transmit channel 108 or read channel 110 over multiple clock cycles. Thus, a burst transmission may be needed to broadcast a payload with more than 8-bytes.

An implicit addressing scheme may be used to control the sequence of read and write data broadcast on the transmit and read channels 108 and 110. By way of example, if the sending component 102 initiates a write operation by broadcasting an address location with the appropriate read/write signal on the transmit channel 108, then the payload for that write operation may be broadcast on the transmit channel 108 before a new write operation is initiated. If, on the other hand, the sending component 102 initiates multiple read operations by broadcasting the appropriate read/write signals and multiple address locations, the receiving component 104 may retrieve the data in the same sequence in which it receives the address locations.

"Transfer identification tags" may be used as an alternative to an implicit addressing scheme. The sending component 102 may assign a transfer identification tag for each read and write operation. The transfer identification tag may be broadcast on the transmit channel 108 along with the address location associated with that read or write operation. In the case of a write operation, the sending component 102 may send the transfer identification tag with the payload, and the receiving component 104 may use the transfer identification tag recovered from the appropriate group of transfer qualifiers to identify the payload. In the case of a read operation, the receiving component 104 may send the recovered transfer identification tag with the payload, and the sending component may use the transfer identification tag to identify the payload.

Another type of transfer qualifier is a "cacheable attribute signal." The cacheable attribute signal may be used in the case where a microprocessor accesses system memory through a cache. In this case, the sending component 102 is the microprocessor and the receiving component 104 is the cache. If the cache detects a cacheable attribute signal asserted, it may attempt to read the data from the cache or write the data to the cache depending on whether a read or write operation is being called for. If the microprocessor requests a read operation and the data is not cached, then the cache may retrieve the data from system memory and cache the retrieved data before forwarding it to the microprocessor.

A security signal is another type of transfer qualifier. The "security signal" may be used to indicate whether the payload is data or an instruction. The security signal may also be used to grant access to a bus mastering device to a particular memory resource.

The various concepts described thus far may be implemented using any number of protocols. In the detailed description to follow, an example of a bus protocol will be presented. This bus protocol is being presented to illustrate the inventive aspects of a processing system, with the understanding that such inventive aspects may be used with any suitable protocol. The basic signaling used for this protocol is shown below in Table 1. Those skilled in the art will readily be able to vary and/or add signals to this protocol in the actual implementation of the bus structure described herein.

TABLE 1

| Signal | Definition | Driven By |
|---|---|---|
| Clock | the reference clock signal | Processing System |
| AValid | a valid address is being broadcast on the transmit channel | Sending component |
| Transfer Ack | indicates receiving component is capable of accepting a request to perform a read or write operation | Receiving component |
| Transmit Channel | 64-bit bus for broadcasting address information, transfer qualifiers, and write data to the receiving component | Sending component |
| Write Ack | indicates receiving component is capable of accepting write data | Receiving component |
| Read Channel | 64-bit bus for broadcasting read data to the sending component | Receiving component |
| Read Ack | acknowledgment to the sending component that receiving component is broadcasting read data on the Read Channel | Receiving component |

Figure 3:
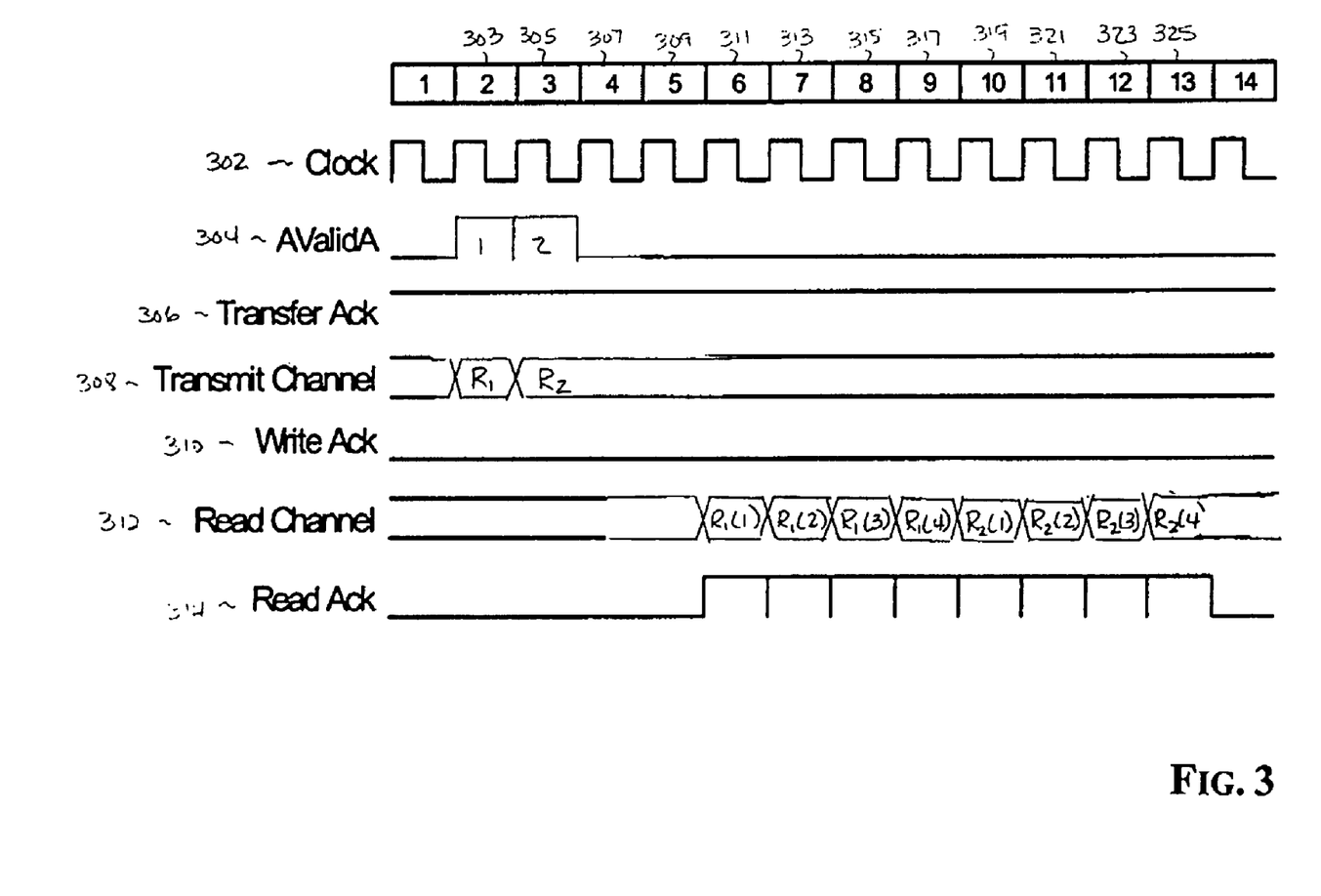
FIG. 3 is a timing diagram showing two pipelined read operations over a two channel bus capable of supporting address information, data, and transfer qualifiers.

FIG. 3 is a timing diagram showing two pipelined read operations over a two channel bus capable of supporting address information, data, and transfer qualifiers. A System Clock 302 may be used to synchronize communications between the sending component and the receiving component. The System Clock 302 is shown with fourteen cycles, with each cycle numbered sequentially for ease of explanation.

A read operation may be initiated by the sending component during the second clock cycle 303 by asserting the AValid 304 signal. Concurrently with the assertion of the AValid 304 signal, the sending component may broadcast an address location and a group of transfer qualifiers associated with a first read operation $R_1$ over the Transmit Channel 308. The transfer qualifiers may include a read/write signal and a payload size signal, which together notify the receiving component that the sending component is requesting a 32-byte read operation. The transfer qualifiers may also include a burst transmission signal and a byte enable signal. In this case, the signals may be set to indicate to the receiving component that the payload should be broadcast as a burst transmission extending over four clock cycles using all byte lanes of the 64-bit Read Channel 312. The transfer qualifiers may also include a transfer identification tag that the receiving component may send with the payload. A security signal may also be included in the transfer qualifiers to grant access to the receiving component. In the case of a broadcast from a microprocessor to system memory, a cacheable attribute signal may also be included in the transfer qualifiers.

When the receiving component detects the assertion of the AValid 304 signal, it may sample the address information and associated group of transfer qualifiers from the Transmit Channel 308. The receiving component may determine from the read/write signal, the payload size signal, the burst transmission signal, and the byte enable signal that the sending device is requesting a 32-byte read operation to be broadcast in a burst transmission extending over four clock cycles on all byte lanes of the Read Channel 312. In the case where the receiving component is a cache, the receiving component may also check the transfer qualifiers for a cacheable attribute signal. The receiving component may also determine whether the sending component is authorized to access the read data by checking the security signal. If the security signal is not asserted, the receiving component may send a signal back to the sending component indicating that it is not authorized to read data. Assuming that the security signal is properly asserted, the receiving component may begin retrieving data at the appropriate address locations. The receiving component may also assert a Transfer Ack 306 signal indicating that it received the broadcast. In this case, the Transfer Ack 306 signal is continuously asserted.

At the end of the second clock cycle 303, the sending component may detect the assertion of the Transfer Ack 306 signal, and respond by initiating another read operation. This may be achieved by asserting the AValid 304 signal and broadcasting an address location and a group of transfer qualifiers associated with a second read operation $R_2$ over the Transmit Channel 308. The transfer qualifiers may again include signaling that notifies the receiving component that the sending device is authorized to initiate a 32-byte read operation, and that the payload read from the receiving component should be broadcast in a burst transmission extending over four clock cycles on all byte lanes of the Read Channel 312. A transfer identification tag, a security signal, and/or a cacheable attribute signal may also be included in the transfer qualifiers.

When the receiving component detects the assertion of the AValid 304 signal, it may sample the address information and associated group of transfer qualifiers from the Transmit Channel 308. Assuming that the security signal is asserted, the receiving component may begin retrieving data at the appropriate address locations. The receiving component may also assert the Transfer Ack 306 signal indicating that it received the broadcast.

Once the sending component detects the Transfer Ack 306 signal at the end of the third clock cycle 305, it may deassert the AValid 304 signal in the fourth clock cycle 307, indicating to the receiving component that a read or write operation will not be requested.

Due to the read latency of the receiving component, a several clock cycle delay may be experienced before the read data can be provided to the Read Channel 312. In this case, the first 8-bytes of the payload $R_1(1)$ associated with the first read operation $R_1$ may be retrieved from the receiving component and broadcast on the Read Channel 312 during the sixth clock cycle 311, the second 8-bytes of payload $R_1(2)$ associated with the first read operation $R_1$ may be retrieved from the receiving component and broadcast on the Read Channel 312 during the seventh clock cycle 313, the third 8-bytes of the payload $R_1(3)$ associated with the first read operation $R_1$ may be retrieved from the receiving component and broadcast on the Read Channel 312 during the eighth clock cycle 315, and the final 8-bytes of the payload $R_1(4)$ associated with the first read operation $R_1$ may be retrieved from the receiving component and broadcast on the Read Channel 312 during the ninth clock cycle 317. The corresponding transfer identification tag may be sent with each 8-byte broadcast. During this four clock cycle broadcast, the receiving component may assert the Read Ack 314 signal to indicate to the sending component that it is broadcasting read data on the Read Channel 312.

In a similar fashion, the payload $R_2(1)$, $R_2(2)$, $R_2(3)$ and $R_2(4)$ associated with the second read operation $R_2$ may be retrieved from the receiving component and broadcast on the Read Channel 312 during the tenth, eleventh, twelfth and thirteenth clock cycles 319, 321, 323 and 325. During this four clock cycle broadcast, the receiving component may keep the Read Ack 314 signal asserted to indicate to the sending component that it is broadcasting read data on the Read Channel 312.

Figure 4:
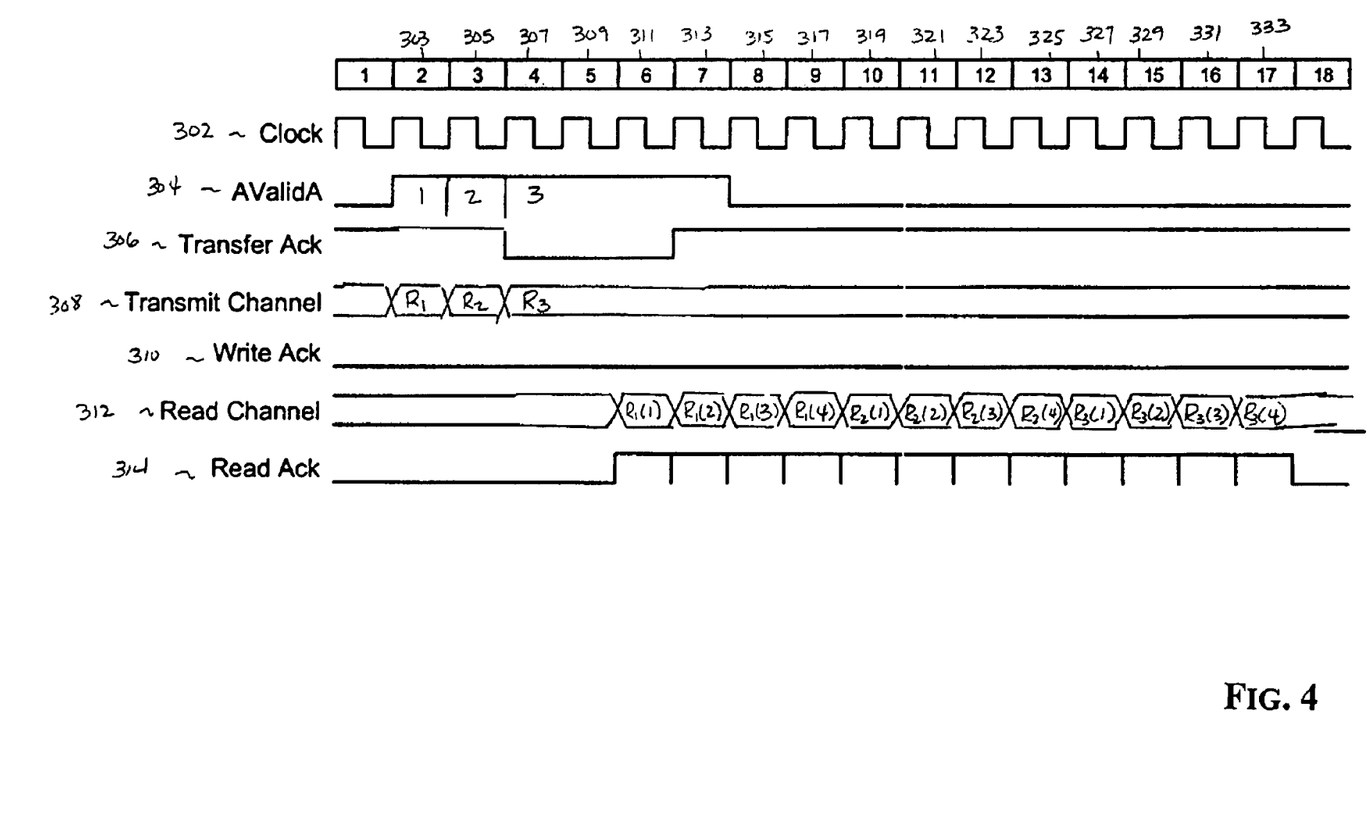
FIG. 4 is a timing diagram showing three pipelined read operations over a two channel bus capable of supporting address information, data, and transfer qualifiers.

FIG. 4 is a timing diagram showing three pipelined read operations over a two channel bus capable of supporting address information, data, and transfer qualifiers. The two read operations described earlier in connection with FIG. 3 are repeated in FIG. 4, and therefore, will not be discussed any further.

An additional read operation may be initiated by the sending component in the fourth clock cycle 307 by broadcasting an address location $R_3$ and a group of transfer qualifiers associated with a third read operation $R_3$ over the Transmit Channel 308. The transfer qualifiers may again include signaling that notifies the receiving component that the sending device is authorized to initiate a 32-byte read operation, and that the payload read from the receiving component should be broadcast in a burst transmission extending over four clock cycles on all byte lanes of the Read Channel 312. A transfer identification tag and/or a cacheable attribute signal may also be included in the transfer qualifiers.

During the same clock cycle, the receiving component may deassert the Transfer Ack 306 signal indicating that it cannot currently accept the broadcast because, by way of example, its address queue is full. The sending component may detect that the Transfer Ack 306 signal is not asserted at the end of the fourth clock cycle 309. In response, the sending component may continue to broadcast the address location and the group of transfer qualifiers associated with the third read operation $R_3$ on the Transmit Channel 308 until the sending component detects a Transfer Ack 306 signal from the receiving component. In this case, the broadcast continues in the fifth, sixth and seventh clock cycles 309, 311 and 313. During the seventh cycle 313, the receiving component may be able to receive a broadcast on the Transmit Channel 308 and perform the requested operation, as indicated by the assertion of the Transfer Ack 306 signal. In response to the asserted Transfer Ack 306 signal, the sending component may determine that it no longer needs to broadcast the address location and the group of transfer qualifiers associated with the third read operation $R_3$ during the eighth clock cycle 315, and may deassert the AValid 304 signal.

Alternatively, the sending component may queue the broadcast for the address location and the group of transfer qualifiers associated with the third read operation $R_3$ when it detects that the Transfer Ack 306 signal is not asserted at the end of the fourth clock cycle 307. The broadcast may be queued until the receiving component indicates that it is ready to accept a broadcast over the Transmit Channel 308 by reasserting the Transfer Ack 306 signal. In this case, the sending component may monitor the Transfer Ack 306 signal until it is asserted by the receiving component in the seventh clock cycle 313. When the sending component detects that the Transfer Ack 306 signal is asserted at the end of the seventh clock cycle 313, it may broadcast the queued address location and group of transfer qualifiers over the Transmit Channel 308 in the eighth clock cycle 315. During the fifth, sixth and seventh clock cycles 309, 311, and 313, the sending component may broadcast new address locations and appropriate groups of transfer qualifiers on the Transmit Channel 308, or broadcast any outstanding data to write to the receiving component.

Returning to FIG. 4, the receiving component may be able to receive a broadcast on the Transmit Channel 308 and perform the requested operation in the seventh clock cycle 313. More specifically, the receiving component may sample the address information and associated group of transfer qualifiers from the Transmit Channel 308. Assuming that the security signal is asserted, the receiving component may begin retrieving the payload associated with the third read operation $R_3$. The first 8-bytes of the payload $R_3(1)$ associated with the third read operation $R_3$ may be retrieved from the receiving component and broadcast on the Read Channel 312 during the fourteenth clock cycle 327, the second 8-bytes of the payload $R_3(2)$ associated with the third read operation $R_3$ may be retrieved from the receiving component and broadcast on the Read Channel 312 during the fifteenth clock cycle 329, the third 8-bytes of the payload $R_3(3)$ associated with the third read operation $R_3$ may be retrieved from the receiving component and broadcast on the Read Channel 312 during the sixteenth clock cycle 331, and the final 8-bytes of the payload $R_3(4)$ associated with the third read operation $R_3$ may be retrieved from the receiving component and broadcast on the Read Channel 312 during the seventeenth clock cycle 333. The corresponding transfer identification tag may be sent with each 8-byte broadcast. During this four clock cycle broadcast, the receiving component may keep the Read Ack 314 signal asserted to indicate to the sending component that it is broadcasting read data on the Read Channel 312.

Figure 5:
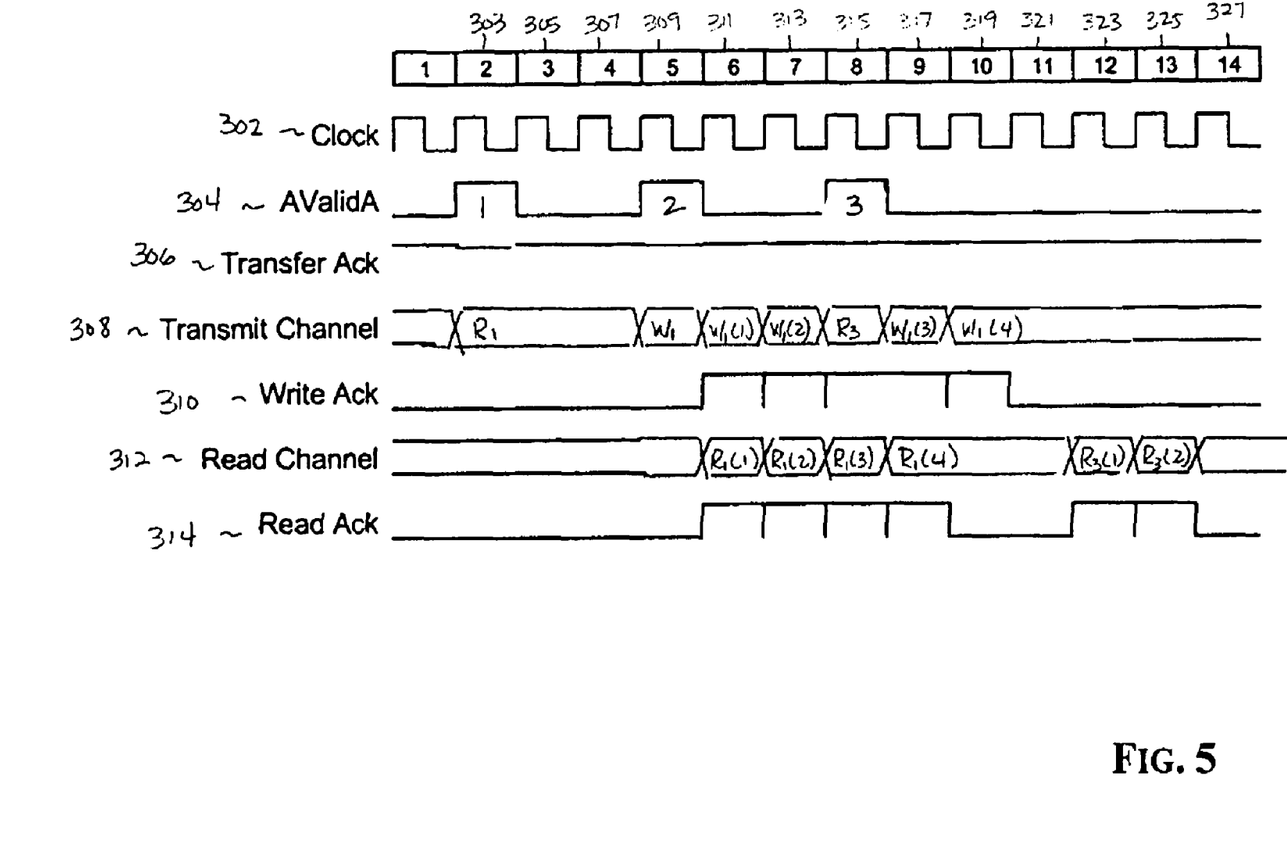
FIG. 5 is a timing diagram showing read and write operations over a two channel bus capable of supporting address information, data, and transfer qualifiers.

FIG. 5 is a timing diagram showing read and write operations over the a two channel bus capable of supporting address information, data, and transfer qualifiers. A read operation may be initiated by the sending component during the second clock cycle 303. This may be achieved by asserting the AValid 304 signal and broadcasting a an address location and a group of transfer qualifiers associated with a first read operation $R_1$ over the Transmit Channel 308. The transfer qualifiers may include signaling that notifies the receiving component that the sending device is authorized to initiate a 32-byte read operation, and that the payload read from the receiving component should be broadcast in a burst transmission extending over four clock cycles on all byte lanes of the Read Channel 312. A transfer identification tag and/or a cacheable attribute signal may also be included in the transfer qualifiers.

When the receiving component detects the assertion of the AValid 304 signal, it may sample the address information and associated group of transfer qualifiers from the Transmit Channel 308. Assuming that the security signal is asserted, the receiving component may begin retrieving the payload associated with the first read operation $R_1$. The receiving component may also assert a Transfer Ack 306 signal indicating that it has received the broadcast.

The sending component may detect the Transfer Ack 306 signal at the end of the second clock cycle 303. Responsive to the Transfer Ack 306 signal, the sending component may deassert the AValid 304 signal during the third clock cycle 305 indicating to the receiving component that it will not be sending address information and transfer qualifiers on the Transmit Channel 308.

In the fifth clock cycle 309, the sending component may initiate a write operation by asserting the AValid 304 signal and broadcasting an address location and a group of transfer qualifiers associated with a first write operation $W_1$ over the Transmit Channel 308. The transfer qualifiers may include signaling that notifies the receiving component that the sending device is authorized to initiate a 32-byte write operation, and that the payload will be broadcast in a burst transmission extending over four clock cycles on all byte lanes of the Transmit Channel 308. A transfer identification tag and/or a cacheable attribute signal may also be included in the group of transfer qualifiers.

When the receiving component detects the AValid 304 signal, it may sample the address information and associated group of transfer qualifiers from the Transmit Channel 308. In response to the transfer qualifiers, the receiving component may assert the Transfer Ack 306 signal indicating that it has received the broadcast. The receiving component may also assert the Write Ack 310 signal indicating that it is ready to write the payload to the appropriate block of sequential address locations.

In the sixth clock cycle 311, the sending component may begin broadcasting the payload on the Transmit Channel 308. The broadcast may be initiated by deasserting the AValid 304 signal and broadcasting on the Transmit Channel 308 the first 8-bytes of the payload $W_1(1)$ associated with the first write operation $W_1$. The receiving component may write the first 8-bytes of the payload $W_1(1)$ to the appropriate block of sequential address locations.

Concurrently, the first 8-bytes of the payload $R_1(1)$ associated with the first read operation $R_1$ may be retrieved from the receiving component and broadcast on the Read Channel 312 with the corresponding transfer identification tag. The receiving component may also keep the Read Ack 314 signal asserted indicating that it is sending read data on the Read Channel 312.

With the Write Ack 310 signal still asserted at the end of the sixth clock cycle 311, the sending component may broadcast on the Transmit Channel 308 the second 8-bytes of the payload $W_1(2)$ associated with the first write operation $W_1$. The receiving component may write the second 8-bytes of the payload $W_1(2)$ to the appropriate block of sequential address locations.

Concurrently, the second 8-bytes of the payload $R_1(2)$ associated with the first read operation $R_1$ may be retrieved from the receiving component and broadcast on the Read Channel 312 with the corresponding transfer identification tag. The receiving component may also keep the Read Ack 314 signal asserted indicating that it is sending read data on the Read Channel 312.

In the eighth clock cycle 315, the sending component may temporarily suspend broadcasting write data to initiate a new read operation. This may be achieved by asserting the AValid 304 signal and broadcasting an address location and a group of transfer qualifiers associated with a second read operation $R_2$ on the Transmit Channel 308. The transfer qualifiers may include signaling that notifies the receiving component that the sending device is authorized to initiate a 16-byte read operation, and that the payload read from the receiving component should be broadcast in a burst transmission extending over two clock cycles on all byte lanes of the Read Channel 312. A transfer identification tag and/or a cacheable attribute signal may also be included in the transfer qualifiers.

During the same eighth clock cycle 315, the third 8-bytes of the payload $R_1(3)$ associated with the first read operation $R_1$ may be retrieved by the receiving component and broadcast on the Read Channel 312 with the corresponding transfer identification tag. The receiving component may also keep the Read Ack 314 signal asserted indicating that it is sending read data on the Read Channel 312.

When the receiving component detects the AValid 304 signal at the end of the eighth clock cycle 315, it may sample the address information and associated group of transfer qualifiers from the Transmit Channel 308. Assuming that the security signal is asserted, the receiving component may begin retrieving the payload associated with the second read operation $R_2$. The receiving component may also assert a Transfer Ack 306 signal indicating that it has received the broadcast.

Simultaneously, the receiving component may broadcast on the Read Channel 312 the final 8-bytes of the payload $R_1(4)$ associated with the first read operation $R_1$ with the corresponding transfer identification tag. The receiving component may also keep the Read Ack 314 signal asserted indicating that it is sending read data on the Read Channel 312.

In the same ninth clock cycle 317, the sending component may deassert the AValid 304 signal indicating to the receiving component that the sending component will resume broadcasting data on the Transmit Channel 308. With the Write Ack 310 signal still asserted, the sending component may broadcast on the Transmit Channel 308 the third 8-bytes of the payload $W_1(3)$ associated with the first write operation $W_2$. The receiving component may write the third 8-bytes of the payload to the appropriate block of sequential address locations.

With the broadcast of the final 8-bytes of the payload $R_1(4)$ associated with first read operation $R_1$, the receiving component has completed the read operation initiated by the sending component during the second clock cycle 303. Therefore, the receiving component may deassert the Read Ack 314 signal in the tenth clock cycle 319. Due to the read latency of the receiving component, it may not be ready to broadcast the payload associated with the second read operation $R_2$.

With the Write Ack 310 signal still asserted in the tenth clock cycle 319, the sending component may broadcast on the Transmit Channel 308 the final 8-bytes of the payload $W_1(4)$ associated with the first write operation $W_1$. The receiving component may write the final 8-bytes of the payload to the appropriate block of sequential address locations. With this broadcast, the outstanding write operations are complete, and therefore, the receiving component may deassert the Write Ack 310 signal in the following clock cycle 321.

In the twelfth clock cycle 323, the first 8-bytes of the payload $R_2(1)$ associated with the second read operation $R_2$ may be retrieved from the receiving component and broadcast on the Read Channel 312. In the following clock cycle 325, the final 8-bytes of the payload $R_2(2)$ associated with the second read operation $R_2$ may be retrieved from the receiving component and broadcast on the Read Channel 312. At the completion of the payload broadcast, the receiving component may deassert the Read Ack 314 signal in the fourteenth clock cycle 327.

The ability of the processing system to broadcast address information in the middle of a write operation that extends over multiple clock cycles may depend on the buffering capabilities of the sending and receiving components. In at least one embodiment of the processing system, the sending component may be implemented with a programmable means for enabling or disabling this feature based on potential performance advantages or supported buffering capabilities.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the terminal, or elsewhere. In the alternative, the processor and the storage medium may reside as discrete components in the terminal, or elsewhere.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communicating between a sending component and a receiving component over a bus, the bus comprising a first channel, which is a single channel, and a second channel, the method comprising:

broadcasting from the sending component on the first channel a plurality of read and write address locations, a plurality of transfer qualifiers, and write data;

storing the write data broadcast on the first channel at the receiving component based on the write address locations and a first portion of the transfer qualifiers;

retrieving read data from the receiving component based on the read address locations and a second portion of the transfer qualifiers; and broadcasting from the receiving component the retrieved read data on the second channel;

wherein the transfer qualifiers comprise a plurality of transfer qualifier groups, each of the transfer qualifier groups comprising one or more of the transfer qualifiers;

wherein each of the transfer qualifier groups is broadcast on the first channel concurrently with a different one of the address locations;

wherein the receiving component stores a portion of the write data based on the transfer qualifier group and the address location contained in one of the concurrent broadcasts;

wherein one of the transfer qualifiers in the transfer qualifier group contained in said one of the concurrent broadcasts comprises a payload size signal indicating the number of bytes contained in the portion of the write data;

wherein a second one of the transfer qualifiers in the transfer qualifier group contained in said one of the concurrent broadcasts comprise a burst transmission signal to indicate the number of clock cycles that the sending component will use to broadcast the portion of the write data; and wherein a third one of the transfer qualifiers in the transfer qualifier group contained in said one of the concurrent broadcasts comprise a byte enable signal to indicate the number of bytes of the write data that will be broadcast by the sending component during each of the clock cycles.

2. The method of claim 1 wherein the receiving component stores the portion of the write data to a block of sequential address locations beginning with the address location contained in said one of the concurrent broadcasts.

3. The method of claim 1 wherein one of the transfer qualifiers in the transfer qualifier group contained in said one of the concurrent broadcasts comprises a read/write signal indicating a write operation.

4. The method of claim 1 wherein one of the transfer qualifiers in the transfer qualifier group contained in said one of the concurrent broadcasts comprises a transfer identification tag to identify the portion of the write data.

5. The method of claim 1 wherein the receiving component retrieves a portion of the read data based on the transfer qualifier group and the address location contained in one of the concurrent broadcasts.

6. The method of claim 5 wherein the receiving component retrieves the portion of the read data from a block of sequential address locations beginning with the address location contained in said one of the concurrent broadcasts.

7. The method of claim 5 wherein one of the transfer qualifiers in the transfer qualifier group contained in said one of the concurrent broadcasts comprises a read/write signal indicating a read operation.

8. The method of claim 7 wherein one of the transfer qualifiers in the transfer qualifier group contained in said one of the concurrent broadcasts comprises a payload size signal indicating the number of bytes contained in the portion of the read data.

9. The method of claim 5 wherein one of the transfer qualifiers in the transfer qualifier group contained in said one of the concurrent broadcasts comprises a transfer identification tag to identify the portion of the read data.

10. The method of claim 1 wherein the first channel comprises a plurality of lines, the sending component broadcasting the address locations on a first portion of the lines and broadcasting the transfer qualifier groups on a second portion of the lines.

11. The method of claim 1 wherein one or more concurrent broadcasts on the first channel is broadcast concurrently with the broadcast of at least a portion of the retrieved read data on the second channel.

12. The method of claim 1 wherein at least a portion of the write data is broadcast on the first channel concurrently with the broadcast of at a least a portion of the retrieved read data on the second channel.

13. The method of claim 1 wherein the sending component broadcasts the address locations, the transfer qualifiers, and the write data on the first channel in a time division multiplexed fashion.

14. The method of claim 1 wherein the write data comprise a plurality of payloads, and wherein the sending component broadcasts at least one of the write or read address locations between first and second portions of one of the payloads.

15. The method of claim 1 wherein the transfer qualifiers comprise a plurality of read/write signals, a plurality of payload size signals, a plurality of burst transmission signals, a plurality of byte enable signals, a plurality of transfer identification tags, a plurality of security signals, and a plurality of cacheable attribute signals.

16. A method of communicating between a sending component and a receiving component over a bus, the bus comprising a first channel, which is a single channel, and a second channel, the method comprising:

broadcasting from the sending component on the first channel a plurality of read and write address locations, a plurality of transfer qualifiers, and write data;

storing the write data broadcast on the first channel at the receiving component based on the write address locations and a first portion of the transfer qualifiers;

retrieving read data from the receiving component based on the read address locations and a second portion of the transfer qualifiers; and broadcasting from the receiving component the retrieved read data on the second channel;

wherein the transfer qualifiers comprise a plurality of transfer qualifier groups, each of the transfer qualifier groups comprising one or more of the transfer qualifiers;

wherein each of the transfer qualifier groups is broadcast on the first channel concurrently with a different one of the address locations;

wherein the receiving component retrieves a portion of the read data based on the transfer qualifier group and the address location contained in one of the concurrent broadcasts;

wherein one of the transfer qualifiers in the transfer qualifier group contained in said one of the concurrent broadcasts comprises a read/write signal indicating a read operation;

wherein one of the transfer qualifiers in the transfer qualifier group contained in said one of the concurrent broadcasts comprises a payload size signal indicating the number of bytes contained in the portion of the read data;

wherein a second one of the transfer qualifiers in the transfer qualifier group contained in said one of the concurrent broadcasts comprises a burst transmission signal to indicate the number of clock cycles that the receiving component will use to broadcast the portion of the read data; and wherein a third one of the transfer qualifiers in the transfer qualifier group contained in said one of the concurrent broadcasts comprises a byte enable signal to indicate the number of bytes of the read data that will be broadcast by the receiving component during each of the clock cycles.

17. A processing system, comprising:

a bus having a first channel, which is a single channel, and a second channel;

a sending component configured to broadcast on the first channel a plurality of read and write address locations, a plurality of transfer qualifiers, and write data; and a receiving component configured to store the write data broadcast on the first channel based on the write address locations and a first portion of the transfer qualifiers, and wherein the receiving component is further configured to retrieve read data based on the read address locations and a second portion of the transfer qualifiers, and broadcast the retrieved read data on the second channel;

wherein the transfer qualifiers comprise a plurality of transfer qualifier groups, each of the transfer qualifier groups comprising one or more of the transfer qualifiers;

wherein the sending component is further configured to broadcast each of the transfer qualifier groups concurrently with a different one of the address locations;

wherein the receiving component is further configured to store a portion of the write data based on the transfer qualifier group and the address location contained in one of the concurrent broadcasts;

wherein one of the transfer qualifiers in the transfer qualifier group contained in said one of the concurrent broadcasts comprises a payload size signal indicating the number of bytes contained in the portion of the write data;

wherein a second one the transfer qualifiers in the transfer qualifier group contained in said one of the concurrent broadcasts comprises a burst transmission signal to indicate the number of clock cycles that the sending component will use to broadcast the portion of the write data; and wherein a third one of the transfer qualifiers in the transfer qualifier group contained in said one of the concurrent broadcasts comprises a byte enable signal to indicate the number of bytes of the write data that will be broadcast by the sending component during each of the clock cycles.

18. The processing system of claim 17 wherein the receiving component is further configured to store the portion of the write data to a block of sequential address locations beginning with the address location contained in said one of the concurrent broadcasts.

19. The processing system of claim 17 wherein one of the transfer qualifiers in the transfer qualifier group contained in said one of the concurrent broadcasts comprises a read/write signal indicating a write operation.

20. The processing system of claim 17 wherein one of the transfer qualifiers in the transfer qualifier group contained in said one of the concurrent broadcasts comprises a transfer identification tag to identify the portion of the write data.

21. The processing system of claim 17 wherein the receiving component is further configured to retrieve a portion of the read data based on the transfer qualifier group and the address location contained in one of the concurrent broadcasts.

22. The processing system of claim 21 wherein the receiving component is further configured to retrieve the portion of the read data from a block of sequential address locations beginning with the address location contained in said one of the concurrent broadcasts.

23. The processing system of claim 21 wherein one of the transfer qualifiers in the transfer qualifier group contained in said one of the concurrent broadcasts comprises a read/write signal indicating a read operation.

24. The processing system of claim 23 wherein one of the transfer qualifiers in the transfer qualifier group contained in said one of the concurrent broadcasts comprises a payload size signal indicating the number of bytes contained in the portion of the read data.

25. The processing system of claim 21 wherein one of the transfer qualifiers in the transfer qualifier group contained in said one of the concurrent broadcasts comprises a transfer identification tag to identify the portion of the read data.

26. The processing system of claim 17 wherein the first channel comprises a plurality of lines, and wherein the sending component is further configured to broadcast the address locations on a first portion of the lines and broadcast the transfer qualifier groups on a second portion of the lines.

27. The processing system of claim 17 wherein the sending is further configured to engage in one or more concurrent broadcasts on the first channel at the same time the receiving component broadcasts at least a portion of the retrieved read data on the second channel.

28. The processing system of claim 17 wherein the sending component is further configured to broadcast at least a portion of the write data on the first channel at the same time the receiving component broadcasts at least a portion of the retrieved read data on the second channel.

29. The processing system of claim 17 wherein the sending component is further configured to broadcast the address locations, the transfer qualifiers, and the write data on the first channel in a time division multiplexed fashion.

30. The processing system of claim 17 wherein the write data comprises a plurality of payloads, and wherein the sending component is further configured to broadcast at least one of the write or read address locations between first and second portions of one of the payloads.

31. The processing system of claim 17 wherein the transfer qualifiers comprise a plurality of read/write signals, a plurality of payload size signals, a plurality of burst transmission signals, a plurality of byte enable signals, a plurality of transfer identification tags, a plurality of security signals, and a plurality of cacheable attribute signals.

32. A processing system, comprising:

a bus having a first channel, which is a single channel, and a second channel;

a sending component configured to broadcast on the first channel a plurality of read and write address locations, a plurality of transfer qualifiers, and write data; and a receiving component configured to store the write data broadcast on the first channel based on the write address locations and a first portion of the transfer qualifiers;

wherein the receiving component is further configured to retrieve read data based on the read address locations and a second portion of the transfer qualifiers, and broadcast the retrieved read data on the second channel;

wherein the transfer qualifiers comprise a plurality of transfer qualifier groups, each of the transfer qualifier groups comprising one or more of the transfer qualifiers;

wherein the sending component is further configured to broadcast each of the transfer qualifier groups concurrently with a different one of the address locations;

wherein the receiving component is further configured to retrieve a portion of the read data based on the transfer qualifier group and the address location contained in one of the concurrent broadcasts;

wherein one of the transfer qualifiers in the transfer qualifier group contained in said one of the concurrent broadcasts comprises a read/write signal indicating a read operation;

wherein one of the transfer qualifiers in the transfer qualifier group contained in said one of the concurrent broadcasts comprises a payload size signal indicating the number of bytes contained in the portion of the read data;

wherein a second one the transfer qualifiers in the transfer qualifier group contained in said one of the concurrent broadcasts comprises a burst transmission signal to indicate the number of clock cycles that the receiving component will use to broadcast the portion of the read data; and wherein a third one the transfer qualifiers in the transfer qualifier group contained in said one of the concurrent broadcasts comprises a byte enable signal to indicate the number of bytes of the read data that will be broadcast by the receiving component during each of the clock cycles.

33. A processing system, comprising:

a bus having a first channel, which is a single channel, and a second channel;

means for broadcasting on the first channel a plurality of read and write address locations, a plurality of transfer qualifiers, and write data; and means for storing the write data broadcast on the first channel based on the write address locations and a first portion of the transfer qualifiers, retrieving read data based on the read address locations and a second portion of the transfer qualifiers, and broadcasting the retrieved read data on the second channel;

wherein the transfer qualifiers comprise a plurality of transfer qualifier groups, each of the transfer qualifier groups comprising one or more of the transfer qualifiers;

wherein the sending component is further configured to broadcast each of the transfer qualifier groups concurrently with a different one of the address locations;

wherein the receiving component is further configured to store a portion of the write data based on the transfer qualifier group and the address location contained in one of the concurrent broadcasts;

wherein one of the transfer qualifiers in the transfer qualifier group contained in said one of the concurrent broadcasts comprises a payload size signal indicating the number of bytes contained in the portion of the write data;

wherein a second one the transfer qualifiers in the transfer qualifier group contained in said one of the concurrent broadcasts comprises a burst transmission signal to indicate the number of clock cycles that the sending component will use to broadcast the portion of the write data; and wherein a third one of the transfer qualifiers in the transfer qualifier group contained in said one of the concurrent broadcasts comprises a byte enable signal to indicate the number of bytes of the write data that will be broadcast by the sending component during each of the clock cycles.

34. A processor-readable medium encoded with instructions for communicating between a sending component and a receiving component over a bus, the bus comprising a first channel, which is a single channel, and a second channel, the instructions comprising code for:

broadcasting from the sending component on the first channel a plurality of read and write address locations, a plurality of transfer qualifiers, and write data;

storing the write data broadcast on the first channel at the receiving component based on the write address locations and a first portion of the transfer qualifiers;

retrieving read data from the receiving component based on the read address locations and a second portion of the transfer qualifiers; and broadcasting from the receiving component the retrieved read data on the second channel;

wherein the transfer qualifiers comprise a plurality of transfer qualifier groups, each of the transfer qualifier groups comprising one or more of the transfer qualifiers;

wherein each of the transfer qualifier groups is broadcast on the first channel concurrently with a different one of the address locations;

wherein the receiving component retrieves a portion of the read data based on the transfer qualifier group and the address location contained in one of the concurrent broadcasts;

wherein one of the transfer qualifiers in the transfer qualifier group contained in said one of the concurrent broadcasts comprises a read/write signal indicating a read operation;

wherein one of the transfer qualifiers in the transfer qualifier group contained in said one of the concurrent broadcasts comprises a payload size signal indicating the number of bytes contained in the portion of the read data;

wherein a second one of the transfer qualifiers in the transfer qualifier group contained in said one of the concurrent broadcasts comprises a burst transmission signal to indicate the number of clock cycles that the receiving component will use to broadcast the portion of the read data; and wherein a third one of the transfer qualifiers in the transfer qualifier group contained in said one of the concurrent broadcasts comprises a byte enable signal to indicate the number of bytes of the read data that will be broadcast by the receiving component during each of the clock cycles.

* * * * *